June 28, 1960 O. E. MATTIAT 2,943,279

PIEZOELECTRIC BAND PASS FILTER

Filed Nov. 17, 1958

INVENTOR,
OSKAR E. MATTIAT

BY

Harry M. Saragovitz
ATTORNEY

United States Patent Office 2,943,279

Patented June 28, 1960

2,943,279

PIEZOELECTRIC BAND PASS FILTER

Oskar E. Mattiat, Santa Barbara, Calif., assignor to the United States of America as represented by the Secretary of the Army Filed Nov. 17, 1958, Ser. No. 774,565

6 Claims. (Cl. 333—72)

This invention relates to electric wave filters, and more particularly to filters comprising piezoelectric ceramic crystals.

The invention relates more specifically to piezoelectric ceramic filters designed for use in radio equipment.

Piezoelectric filters can be made to occupy a very small volume. They are particularly well suited for use in equipment calling for miniaturized components. Moreover, piezoelectric filters exhibit excellent band-pass characteristics.

In transistorized I.F. stages of radio equipment, piezoelectric ceramic filters can be used to replace the conventional I.F. transformers. The essential functions of a piezoelectric filter-transformer when used as an I.F. transformer are as follows: to pass a relatively narrow band of frequencies on either side of the center frequency, to transform one impedance level into another impedance level and to change the input voltage into an output voltage of different magnitude and/or phase.

Accordingly, it is an object of the present invention to provide a piezoelectric ceramic I.F. transformer.

It is an additional object of this invention to provide a piezoelectric I.F. transformer, the characteristics of which may be easily modified.

It is a further object of this invention to provide a piezoelectric ceramic transformer which can be inexpensively manufactured, and which occupies a relatively small volume.

The piezoelectric ceramic filter, in accordance with this invention, comprises a thin ceramic disk the central portion of which is axially polarized, while the remaining portion is radially polarized. The central portion is excited by a suitable radio-frequency signal to its fundamental resonant frequency in the axial mode of vibration. By virtue of the elastic coupling between the central portion, or the driving section, and the circumferential portion, or the driven section, radial vibrations are generated in the driven section. The diameter of the disk is so dimensioned that the frequency of a suitable overtone of the radial mode of vibration is nearly equal to the fundamental resonant frequency of the thickness mode. The two modes of vibration are mechanically coupled by the body of the disk. The rate of coupling between the axial and the radial modes of vibration can be varied by properly thinning the body of the disk between the driving and the driven sections of the disk, the thinning being preferably performed at a locus of minimum radial stress. The radial vibrations of the body of the disk induce radio-frequency signals in the ouput electrodes as will be explained in greater detail in the remainder of the specification.

The features of this invention which are believed to be novel are set forth with particularity in the appended claims. The present invention itself, both as to its organization and manner of operation, together with further objects and advantages thereof, may best be understood by reference to the following description taken in connection with accompanying drawings, in which like reference characters refer to similar parts and in which:

Figure 1:
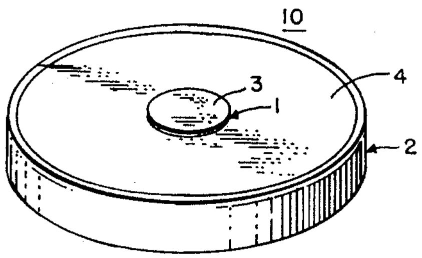
Fig. 1 is a perspective view of the piezoelectric ceramic disk.
Figure 2:
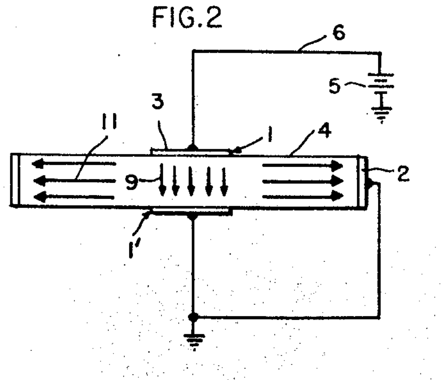
Fig. 2 is a schematic diagram of the circuit used to polarize the disk of Fig. 1.

Taking up the figures in more detail, Figures 1 and 2 show a known type of a piezoelectric ceramic disk 10 comprising two central electrodes 1, 1' and one circumferential electrode 2. Numeral 3 designates the portion of the body of the disk between the central electrodes 1, 1' and is called the "driving" section. Numeral 4 designates the remaining portion of the disk and is called the "driven" section. The disk is made from a ceramic material which may be, for example only, barium titanate, barium titanate mixed with other titanates, or any other ceramic material. The electrodes are formed from any suitable conducting material such as silver, platinum, etc. These electrodes are applied to the disk in any desired fashion, since neither the electrode material nor its manner of application form any part of this invention.

In Fig. 2 is shown the circuit used to polarize the disk of Fig. 1. Wire 6 connects the positive terminal of a direct-current source 5 to the central electrode 1. The other terminal of the D.-C. source and electrodes 1', 2 are returned to ground. Arrows 9 and 11 indicate the direction of polarization within the driving section 3 and the driven section 4, respectively.

Figure 3:
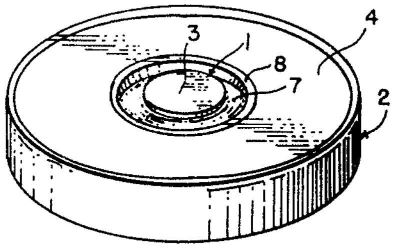
Fig. 3 is a perspective view of the disk of Fig. 1 showing the carved out portion in the thickness direction.
Figure 4:
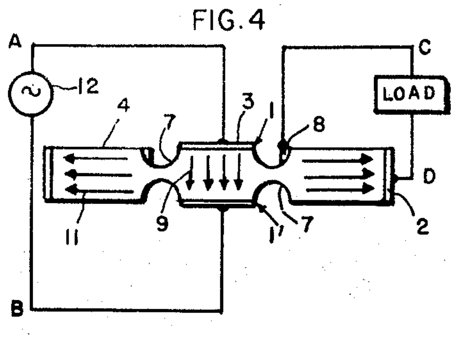
Fig. 4 is a schematic diagram showing the input and the output circuits connected to the cross-section of the disk of Fig. 3 taken along its center.

Figures 3 and 4 illustrate one embodiment in accordance with this invention, which includes a circular groove 7 in each surface of the disk and surrounding the central driving section 3.

When an alternating voltage signal 12 is applied to the center electrodes 1, 1', as shown in Fig. 4, in a direction parallel to the axial polarization of the disk axial vibrations are created in the driving section 3 by virtue of the piezoelectric properties of the polarized ceramic disk. These axial mechanical vibrations in the driving section 3 produce radial mechanical vibrations in the driven section 4 as a result of the resilient coupling between both sections.

The thickness of the disk is so dimensioned that, at the operating frequency, the axially polarized section 3 is driven into fundamental resonance in the thickness mode of vibration. The electrical equivalent circuit of a resonating piezoelectric disk can generally be represented by a tuned circuit having a coil in parallel with a capacitor. Thus, driving section 3 can be viewed as the "primary tuned circuit" of an I.F. transformer.

The radial dimension of the driven section is such that the vibrations in the radial mode resonate in a suitable overtone which corresponds to a frequency equal to the frequency of the vibrations in the thickness mode. For example, the fundamental of the thickness mode corresponds to a frequency of 455 kc., and a suitable overtone of the radial mode also corresponds to 455 kc. Essentially the driven section 4, at resonance, can equally be represented by a parallel tuned circuit, similar to the "secondary tuned circuit" of an I.F. transformer. Thus, in operation, the filter transformer of Figures 3 and 4 acts like a double tuned network comprising a primary and a secondary tuned circuit.

The coefficient of coupling between the primary and the secondary circuits is varied, in accordance with this invention, by suitably thinning the disk between the driving and the driven sections. This has the effect of varying the coupling between the axial and the radial modes of vibration. For mechanical strength considerations the thinning, as indicated by grooves 7 in Figures 3 and 4, should be performed at a point of minimum vibrational stress. Although the circular grooves 7, in Figure 3, are shown to have a semi-circular cross-section, they could equally have rectangular or V shaped cross-sections. For symmetrical operation, it is desirable to make the center of circular groove 7 coincide with the center of disk 10. The ratio of the width to the depth of the groove depends on the diameter of the disk. For a small diameter, the depth should preferably be larger than the width and, vice versa. The distance from the center of the disk to the center of the groove is preferably chosen in such a manner that the center of the groove is at a locus of minimum radial stress.

An auxiliary electrode 8 is provided on groove 7, as shown in Fig. 4. The output is taken between the auxiliary electrode and the circumferential electrode 2. A load is shown to be connected to output terminals C, D.

By analogy to a conventional I.F. transformer, the coefficient of coupling between the primary and the secondary circuits determines the "response" or the attenuation vs. frequency curve of the piezoelectric I.F. transformer. The two tuned resonators 3 and 4 can be made to be over-coupled or critically-coupled, depending on the physical dimensions of groove 7.

Thus, the piezoelectric I.F. transformer of the present invention exhibits similar characteristics to the conventional I.F. transformers. The small volume of the ceramic disk makes its utilization more desirable for transistor circuits than the rather bulky coil-cendenser conventional transformers. Moreover, the input and output impedances of the ceramic disk can be conveniently designed to match the input and output impedances of transistor I.F. amplifiers. The input and output impedances of the ceramic disk transformer of Fig. 4 can be conveniently changed by varying the dimensions of the input and output electrodes. The method of changing the impedance characteristics of the disk, however, does not form any part of this invention.

What is claimed is:

1. In a disk-shaped piezoelectric ceramic transformer having two main faces, a central driving section and an outer driven section, the central driving section being axially polarized whereas the outer driven section is radially polarized, a center electrode disposed on each face of the driving section and a circumferential electrode surrounding the body of the disk, a circular groove on each face of the disk partially separating the driving from the driven section and thereby decreasing the electro-mechanical coupling efficiency between both sections.

2. The transformer in accordance with claim 1 wherein an auxiliary electrode is arranged in one of the grooves.

3. In combination, a disk-shaped piezoelectric ceramic transformer having an upper and a lower face, a central driving section and an outer driven section, the central driving section being axially polarized whereas the outer driven section is radially polarized, a center electrode disposed on each face of the driving section and a circumferential electrode surrounding the body of the disk, a circular groove on each face of the disk partially separating the driving from the driven section and thereby decreasing the electro-mechanical coupling efficiency between both sections, means for applying a radio-frequency signal to the center electrodes for developing axial resonant vibrations in said driving section and radial resonant vibrations in said driven section, an auxiliary electrode on said disk, and two output terminals, one connected to the circumferential electrode and the other to said auxiliary electrode for extracting a radio frequency signal.

4. The transformer in accordance with claim 3 wherein the diameter of the disk is so dimensioned that an overtone of the radial mode of vibration of the driven section is substantially equal to the fundamental resonant frequency of the axial mode of vibration of said driving section.

5. In combination, a disk-shaped piezoelectric ceramic intermediate-frequency transformer having an upper and a lower face, a central driving section and an outer driven section, the central driving section being axially polarized whereas the outer driven section is radially polarized, a center electrode disposed on each face of the driving section and a circumferential electrode surrounding the body of the disk, means for applying a radio-frequency signal to the center electrodes for developing resonant vibrations in the thickness mode in said driving section and resonant radial vibrations in said driven section, a circular groove in each face of the disk partially separating the driving from the driven section, the dimensions of said groove determining the coefficient of coupling between said driving and said driven sections, an auxiliary electrode on said disk, and two output terminals, one connected to the circumferential electrode and the other to said auxiliary electrode for extracting a radio frequency voltage signal.

6. A disk-shaped piezoelectric ceramic transformer having two main faces, a central driving section and an outer driven section, the central driving section being axially polarized whereas the outer driven section is radially polarized, a center electrode disposed on each face of the driving section and a circumferential electrode surrounding the body of the disk, said driving section being dimentioned to vibrate in its fundamental mode of vibration and said driven section being dimensioned to vibrate at a predetermined harmonic corresponding to the same frequency as said fundamental mode of vibration, a circular groove on each face of the disk partially separating the driving from the driven section and thereby varying the coupling coefficient between the axial and the radial modes of vibration.

References Cited in the file of this patent

UNITED STATES PATENTS

| | | |
|---|---|---|
| 2,262,966 | Rohde | Nov. 18, 1941 |
| 2,276,013 | Bohannon | Mar. 10, 1942 |
| 2,596,460 | Arenberg | May 13, 1952 |
| 2,830,274 | Rosen et al. | Apr. 8, 1958 |
| 2,870,521 | Rudnick | Jan. 27, 1959 |